May 21, 1968  D. HOLDEN  3,384,270
ARTICLE DISPENSER HAVING A CELLULAR MAGAZINE
WITH GRAVITY DISCHARGE FROM THE CELLS
Filed April 6, 1965  14 Sheets-Sheet 3

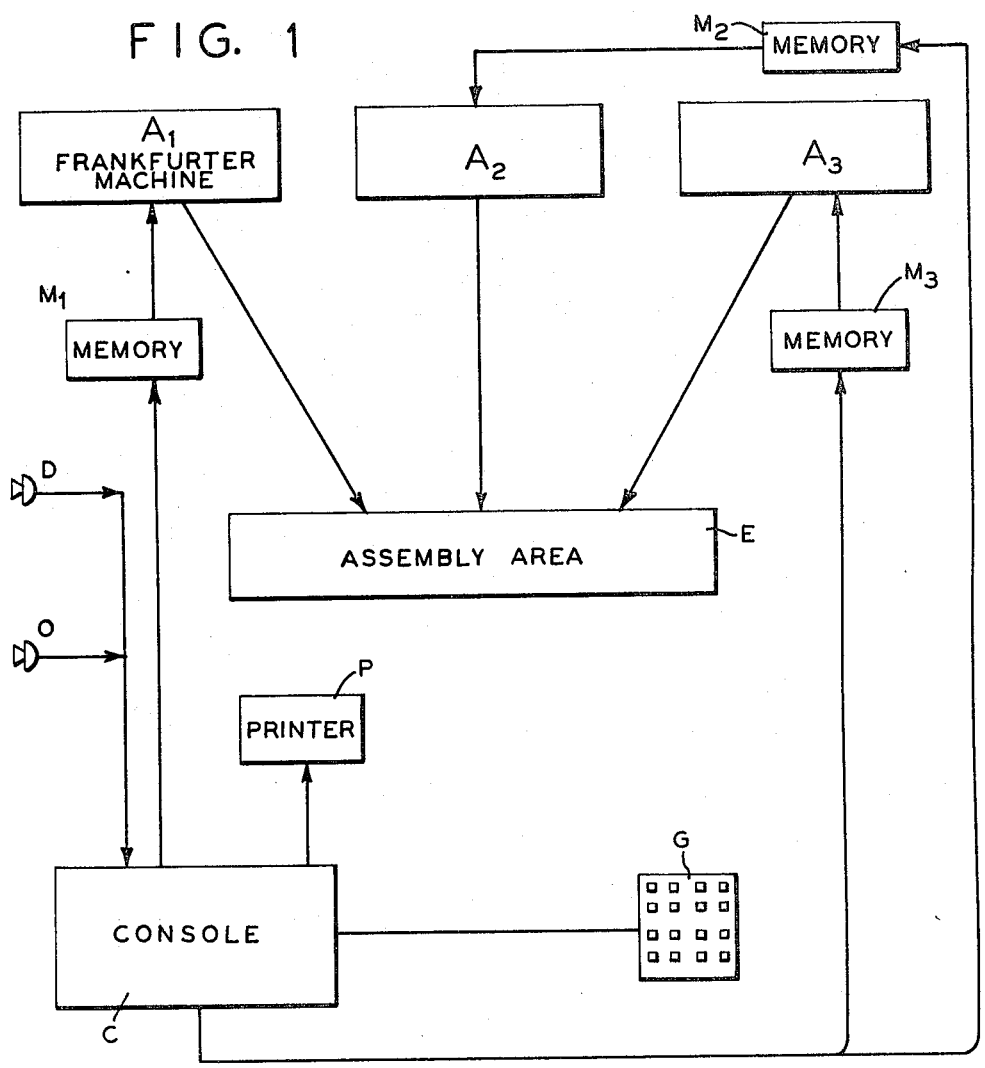

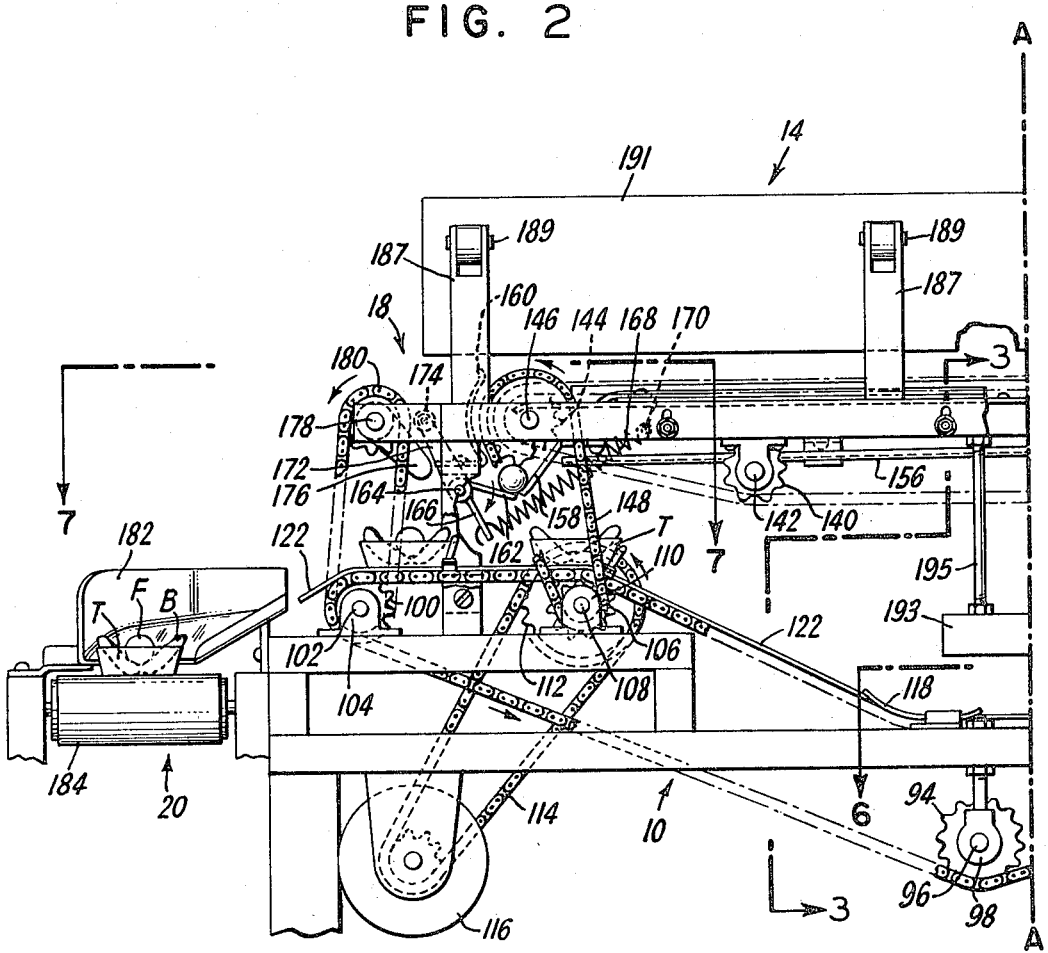

INVENTOR
DERMOT HOLDEN
BY
Arthur J. Plantamura
ATTORNEY

INVENTOR
DERMOT HOLDEN
BY
Arthur J. Plantamura
ATTORNEY

May 21, 1968
D. HOLDEN
3,384,270
ARTICLE DISPENSER HAVING A CELLULAR MAGAZINE
WITH GRAVITY DISCHARGE FROM THE CELLS
Filed April 6, 1965
14 Sheets-Sheet 5
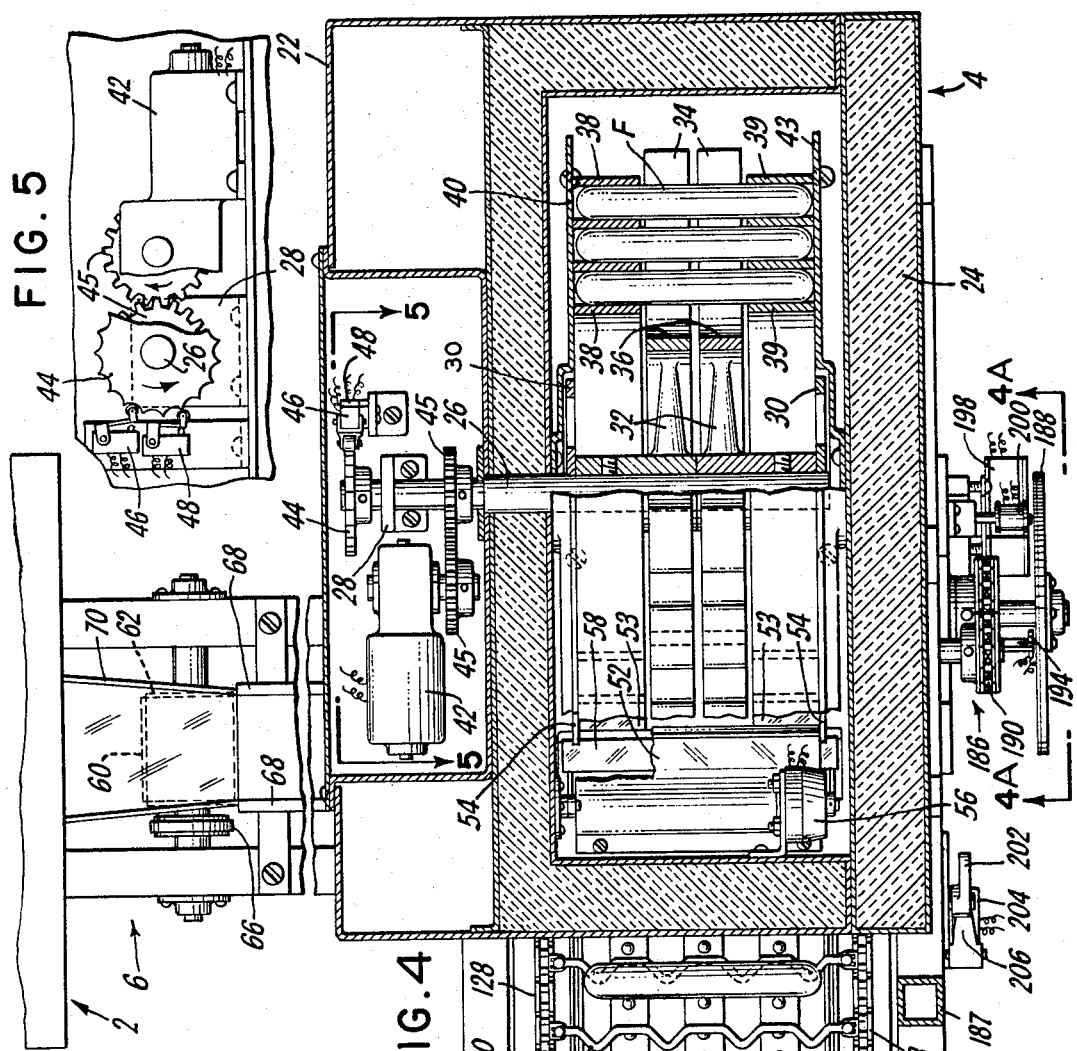
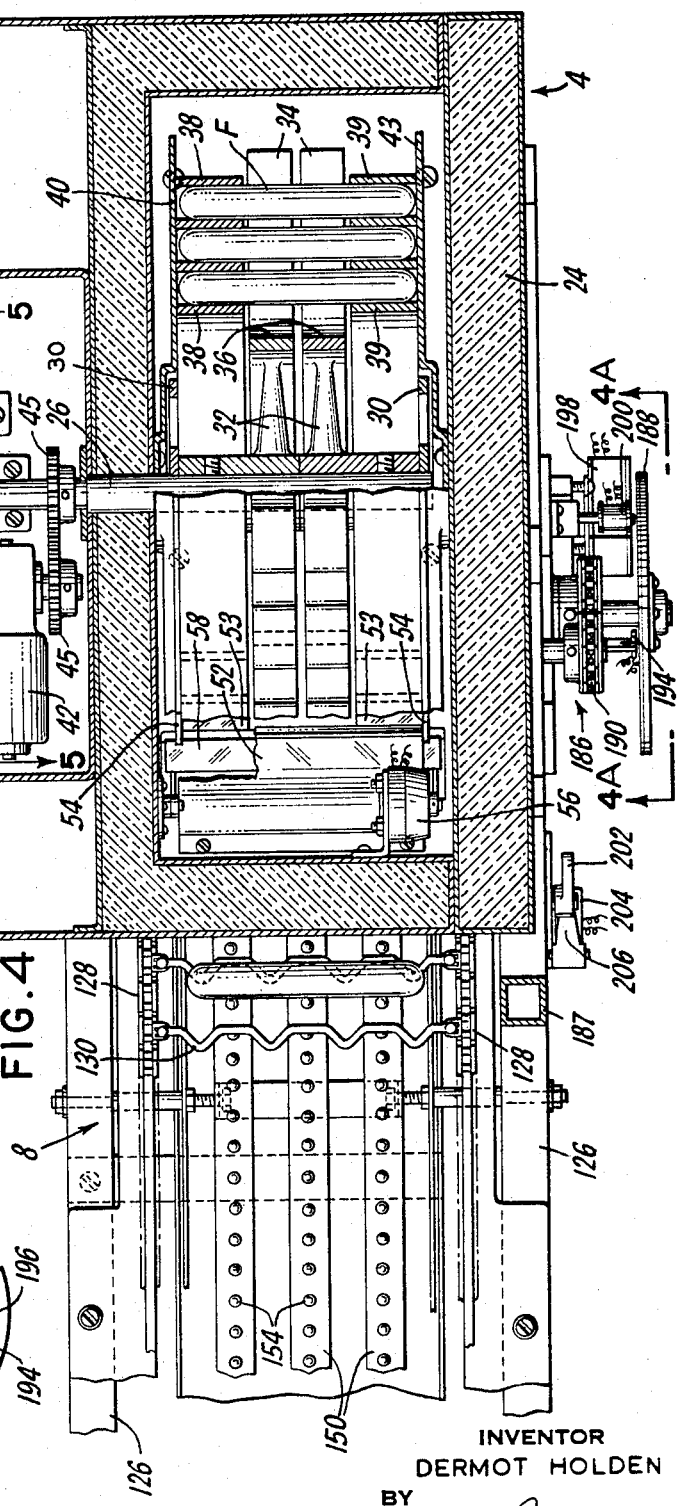
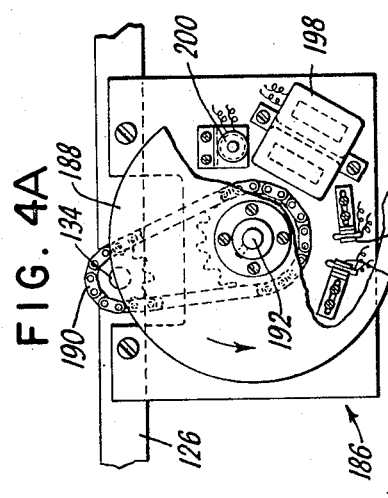
INVENTOR
DERMOT HOLDEN
BY
Arthur J. Plantamura
ATTORNEY

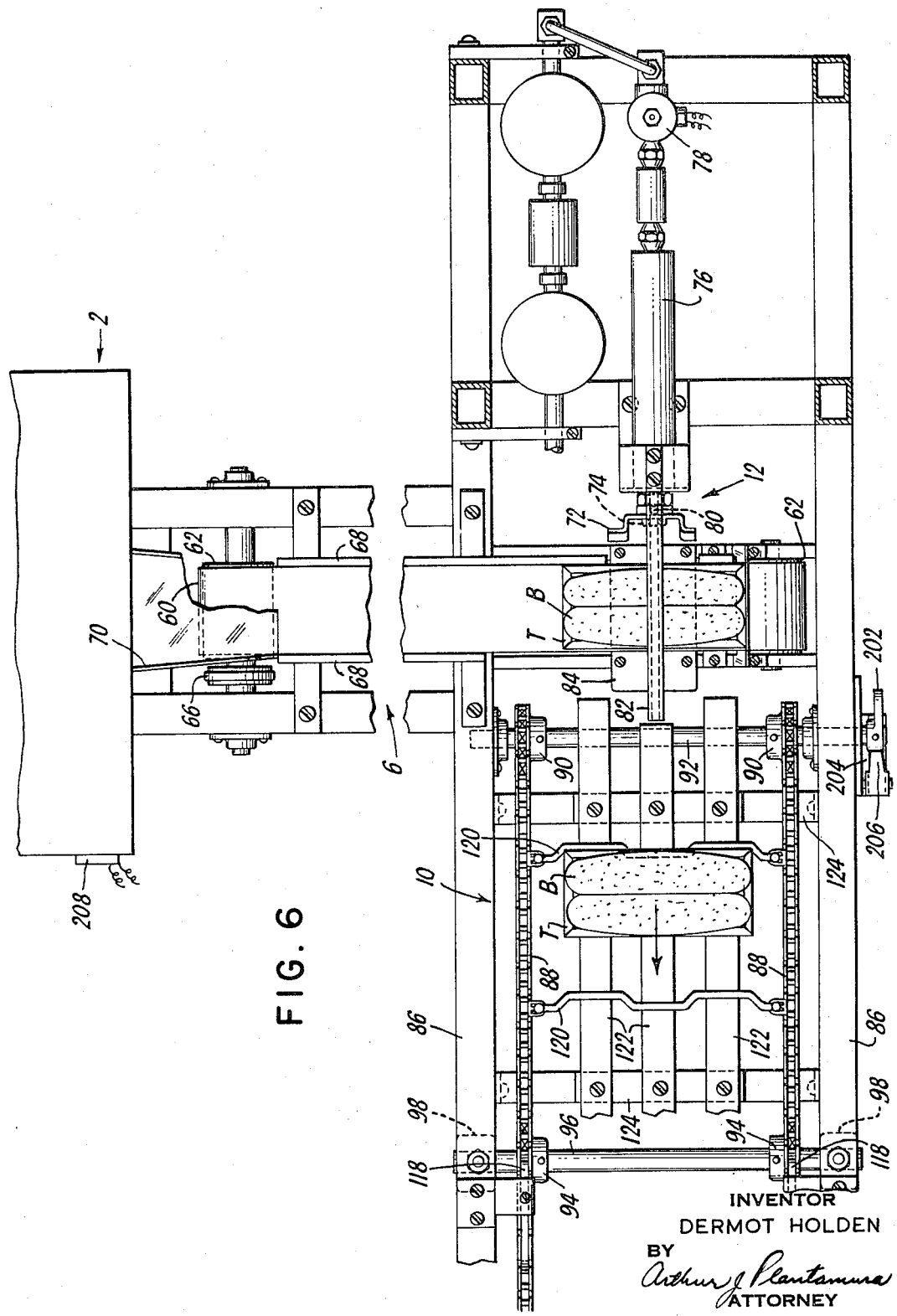

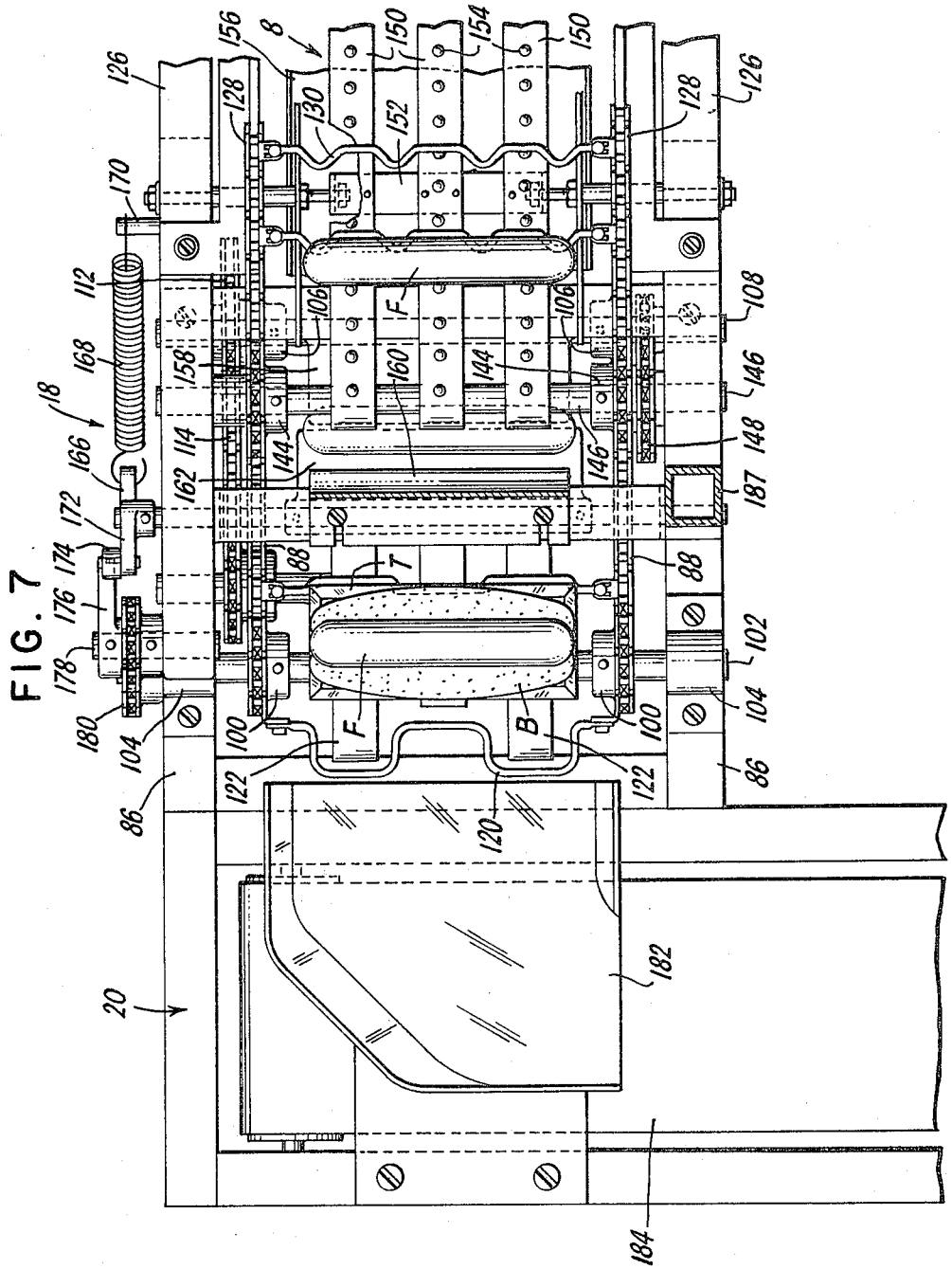

INVENTOR
DERMOT HOLDEN
BY
Arthur J. Plantamura
ATTORNEY.

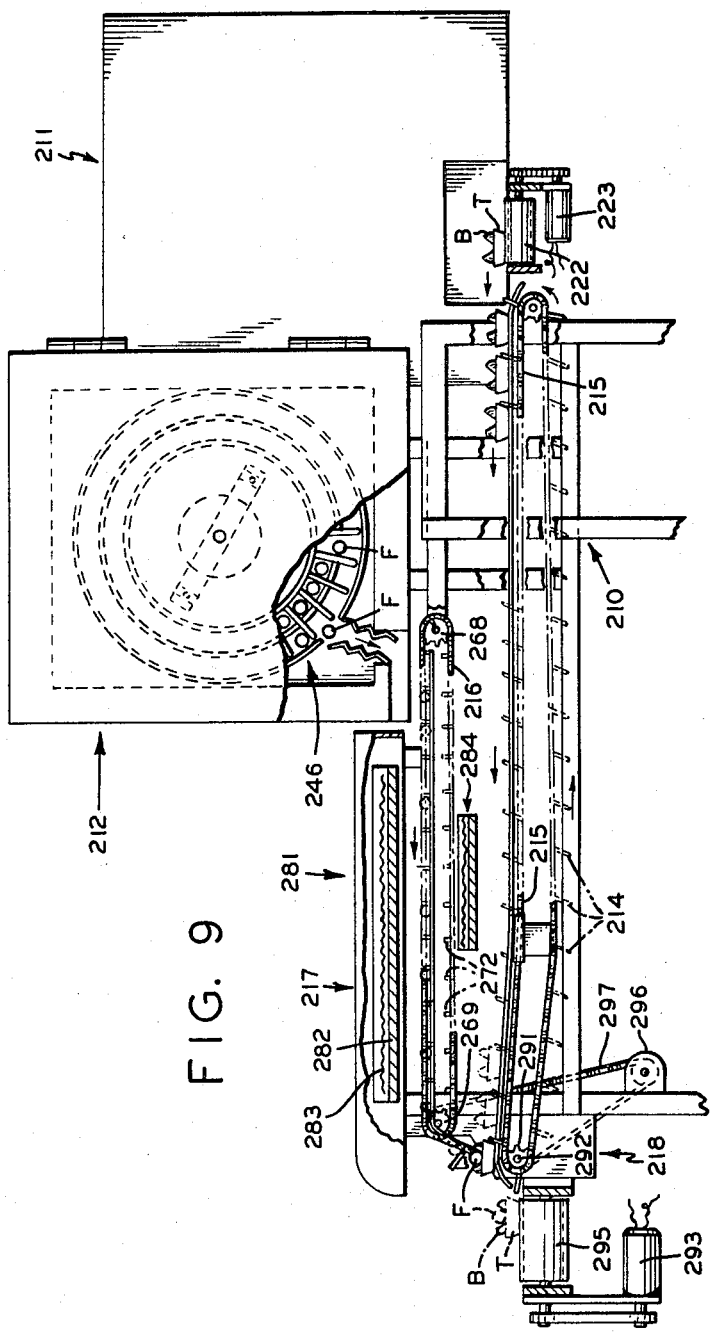

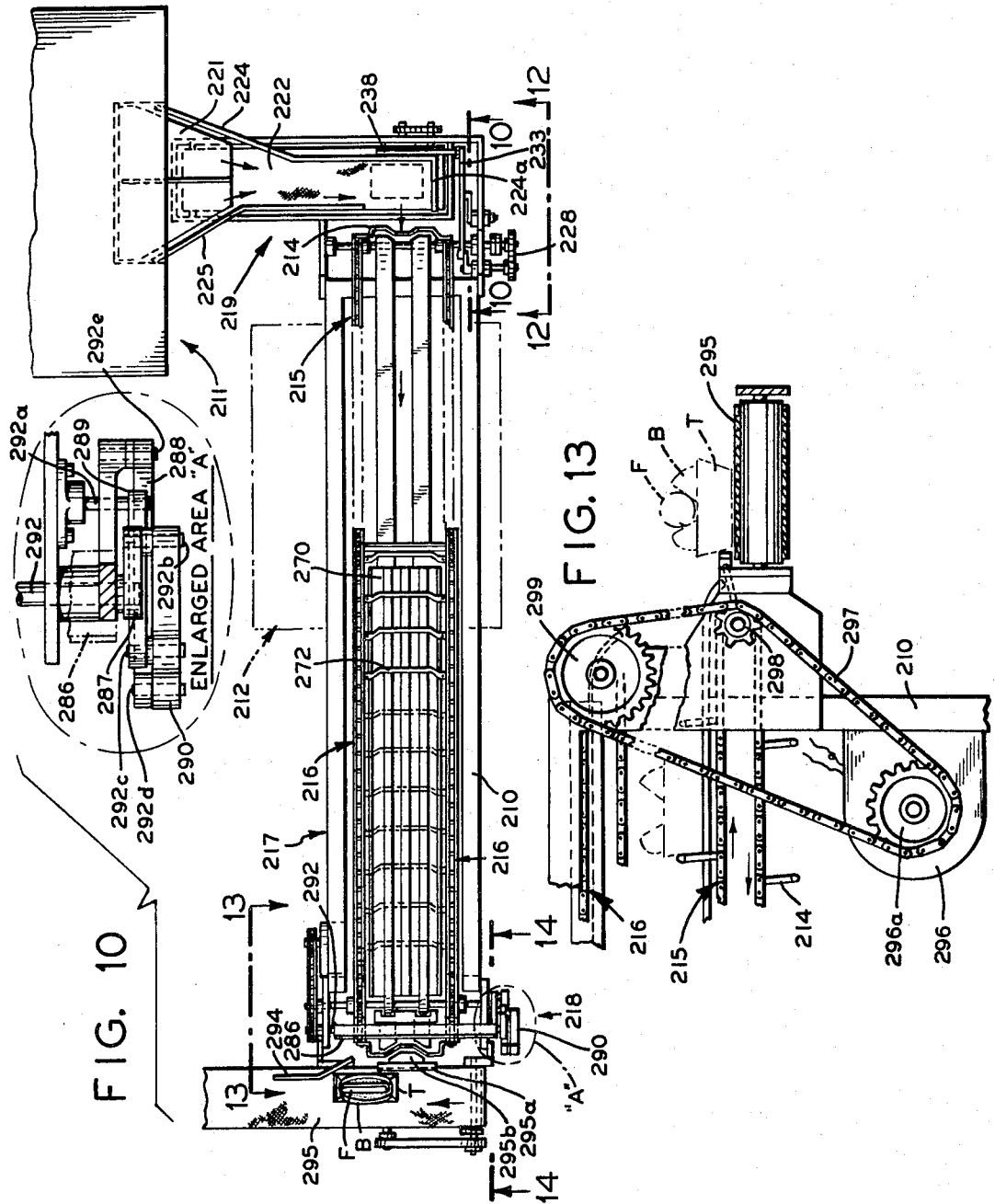

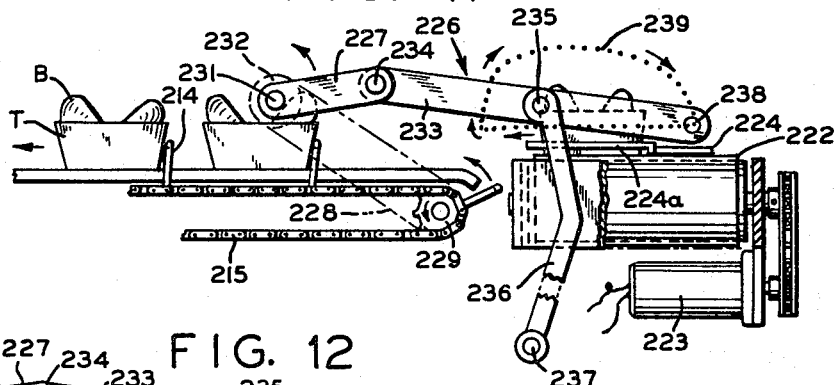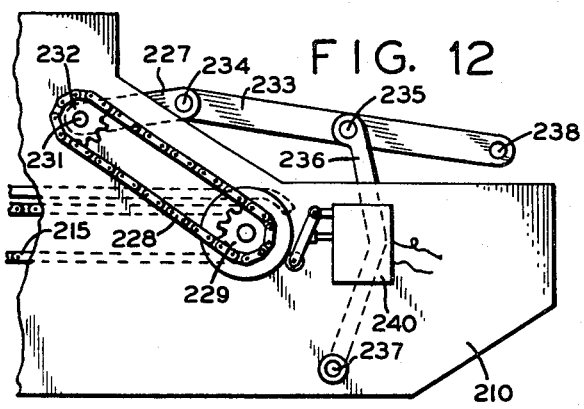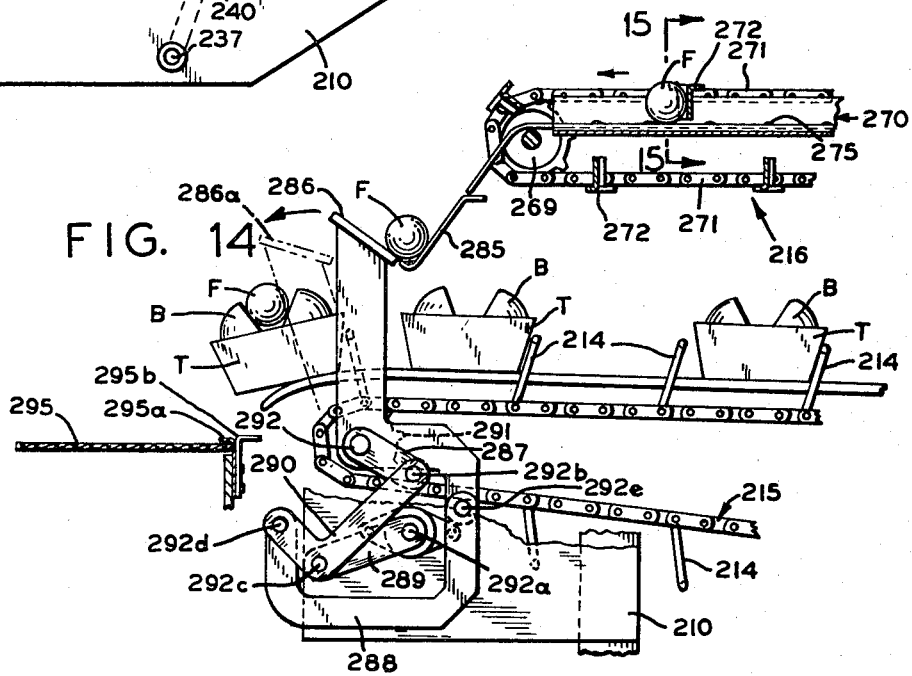

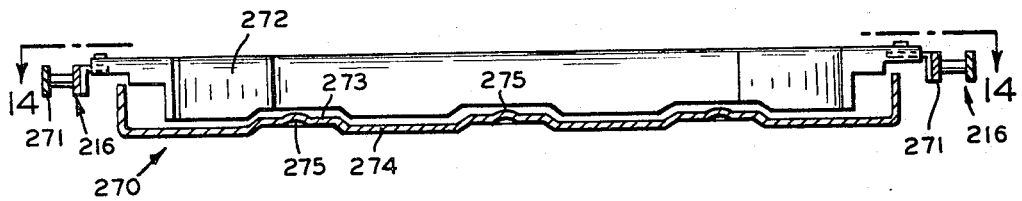
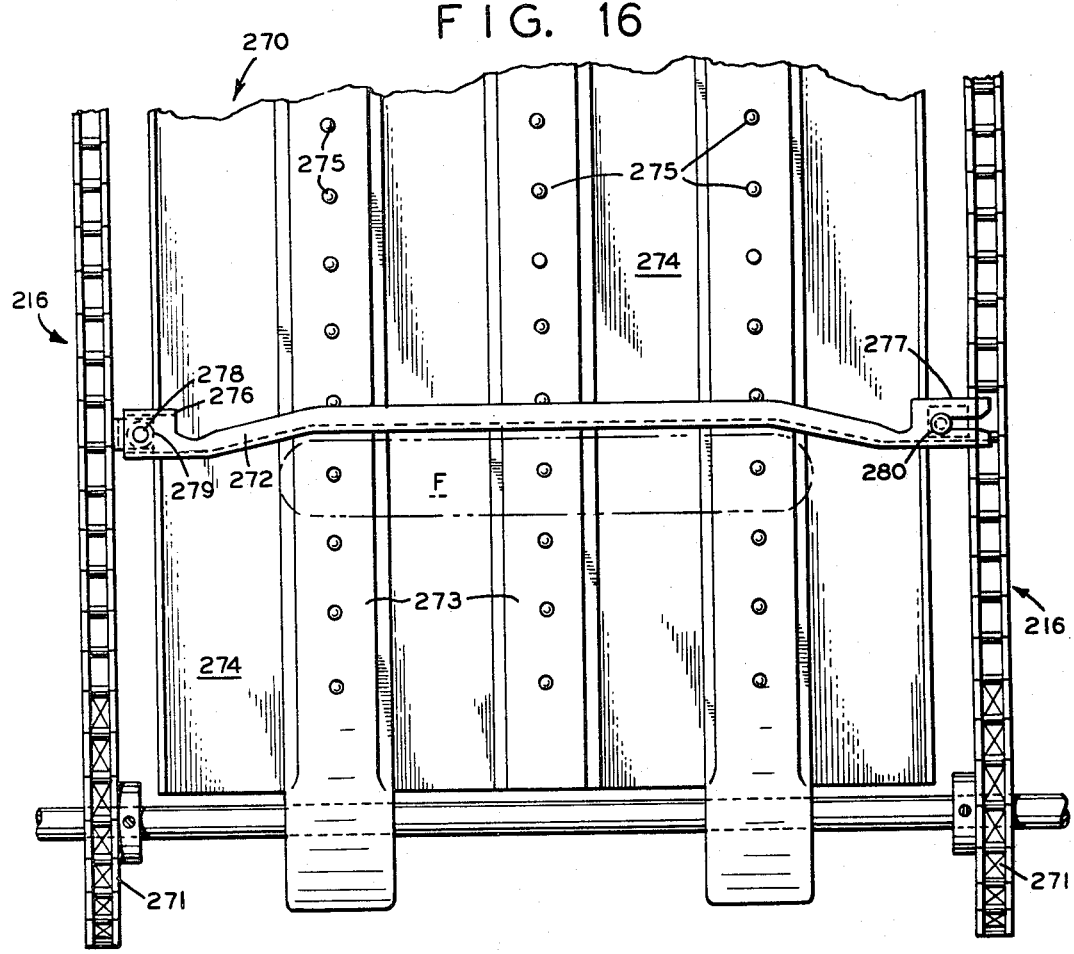

May 21, 1968  D. HOLDEN  3,384,270
ARTICLE DISPENSER HAVING A CELLULAR MAGAZINE
WITH GRAVITY DISCHARGE FROM THE CELLS
Filed April 6, 1965  14 Sheets-Sheet 13
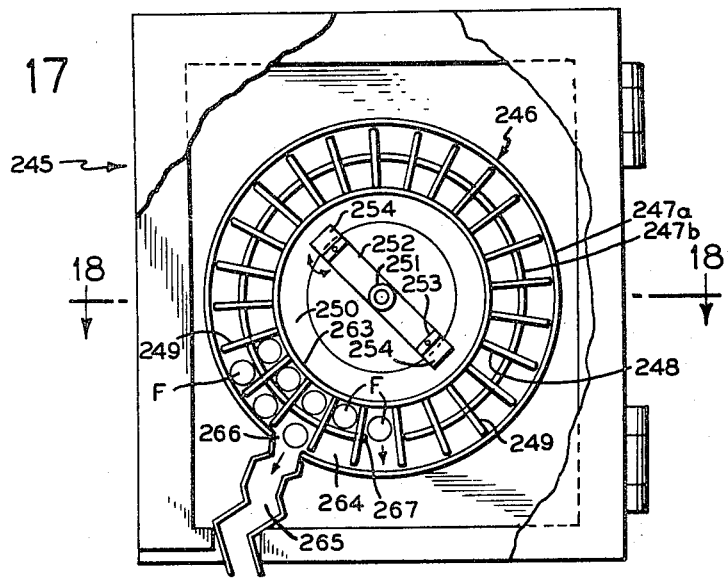
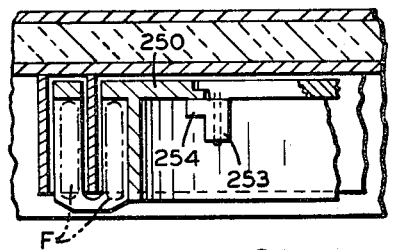
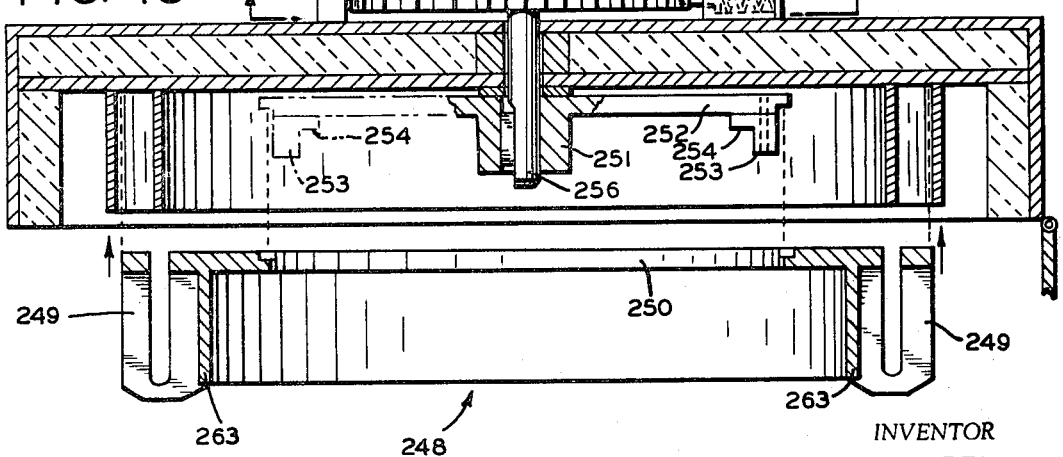
INVENTOR
DERMOT HOLDEN
BY
Arthur J. Plantamura
ATTORNEY.

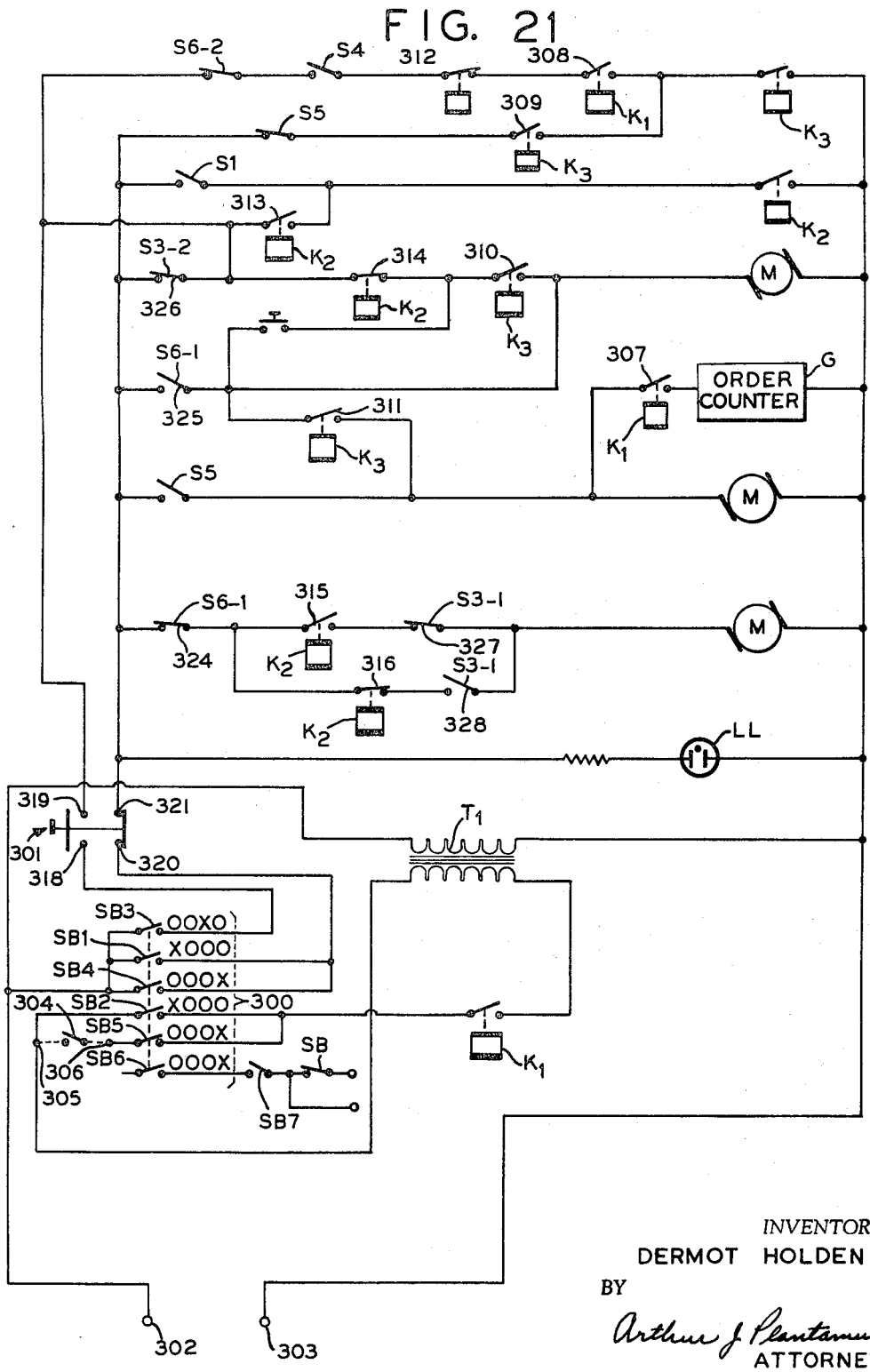

United States Patent Office 3,384,270
Patented May 21, 1968

3,384,270
ARTICLE DISPENSER HAVING A CELLULAR MAGAZINE WITH GRAVITY DISCHARGE FROM THE CELLS
Dermot Holden, Westport, Conn., assignor to American Machine & Foundry Company, a corporation of New Jersey
Filed Apr. 6, 1965, Ser. No. 445,893
1 Claim. (Cl. 221—86)

ABSTRACT OF THE DISCLOSURE

In an automatic frankfurter storage cooking and dispensing apparatus, the improvement in refrigerated storage chambers for said apparatus comprising a magazine forming a plurality of discrete radially disposed frankfurter compartments to individually store frankfurters, said magazine comprising a circular unit provided with a stationary shroud to form said compartments in combination with a compartment divider element rotatably mounted on a horizontal axis, drive means to intermittently rotate said axis wherein said stored frankfurters are cycled en masse in said compartments in a substantially circular direction and wherein individual frankfurters, by an external on-demand dispense signal to said drive means, are fed externally from an opening in said shroud through a delivery chute to a receiver for said frankfurters, and means effecting registration of said rotatable divider element so that successive compartments are in registration with said opening, wherein said rotatable compartment divider element is provided with an inner mounting flange and said axis is provided with a relatively fixed securing bar equipped at its ends with movable securing element to removably lock said mounting flange on said bar.

---

This invention resides in improved machinery for automatically dispensing, heating and assembling an edible meat product, such as a frankfurter, together with a bun or other form of bread. In a more specific embodiment the invention relates to an apparatus which may be incorporated into an automated system for preparing and dispensing an article of food ready for consumption by a customer.

The machinery of the invention is admirably adaptable to be included in remotely actuated systems of food preparing apparatus. Systems of this kind comprise a centrally located attended control station where orders for food items are received directly at the control station or by telephone at dining areas or by other voice communication means such as by a microphone at a drive-in station, and where through electronic ordering and billing equipment a plurality of different food preparation machines are commanded to simultaneously or individually cook and dispense food items.

The apparatus is characterized by its reliable on-demand capability. It is independently operable as distinguished from continuous production units so that even though one or more hours may have elapsed since a prior item was dispensed, upon demand, it functions rapidly and dependably to dispense a single, or an indefinite plurality of items. Moreover, the machine of the invention differs from machines of the prior art such as those normally referred to as vending machines, in that it is capable of accepting and processing (simultaneous) orders while still processing a previous order. A further characteristic resides in the control feature of a sequence of operations all of which may be appropriately triggered from a single electrical impulse which in turn through its inherent mechanism synchronously triggers later functions.

It is an object of the present invention to provide a novel machine for cooking food items.

It is another object of the invention to provide a novel apparatus capable of cooking and assembling frankfurters in bread rolls and dispensing the assembled unit.

It is a further object of the invention to provide an entirely self-contained automated machine for storing, cooking, assembling and dispensing frankfurters and bread rolls therefor.

It is a still further and more particular object of the invention to provide a self-contained automatic machine of this kind which may be readily incorporated in an electronic ordering and billing system so that upon remote command the machine feeds individual stored frankfurters and bread rolls into cooking sections and assemblies then after cooking, and delivers the cooked assembled unit to a central assembly station.

It is yet a further object of the invention to provide a machine capable of accepting and processing individual independent orders and of accepting and processing successive orders for items at the same time that it is processing previous orders.

The above and other objects, features, and advantages of the invention will be better understood from the following detailed description thereof when it is considered in conjunction with the accompanying drawings in which:

FIG. 1 is a schematic diagram of an automated system which includes the machine described hereafter in greater detail for cooking and assembling frankfurters wherein a control station provides the source for initiating (through an electrical system) the preparation and delivery to an assembly area, wholly automatically, of a plurality of food items.

FIGS. 2 and 2A, which are matched along lines A—A together constitutes an overall side view of the machine.

FIG. 4 is a sectional view through the frankfurter dispenser, taken as indicated by lines 4—4 in FIG. 2A.

FIG. 4A is a face view of a suitable programming disc to coordinately control the operations of the machine, as taken along lines 4A—4A in FIG. 4.

FIG. 5 is a side view of the frankfurter dispenser driving assembly, as indicated by lines 5—5 in FIG. 4.

FIG. 6 is a view looking downwardly over the bun dispensing, transferring, and conveying section, as indicated by lines 6—6 in FIGS. 2 and 2A.

FIG. 7 is a plan view of the frankfurter and bun assembly mechanism, as indicated by lines 7—7 in FIG. 2.

FIG. 9 is a side elevational view of an alternate embodiment.

FIG. 10 is a plan view of the embodiment shown in FIG. 9.

FIG. 11 is a view of the bread roll pusher mechanism taken along lines 11—11 of FIG. 10.

FIG. 12 is another detailed view of the bread roll pusher mechanism illustrating the dispenser actuating switch.

Figure 2A:
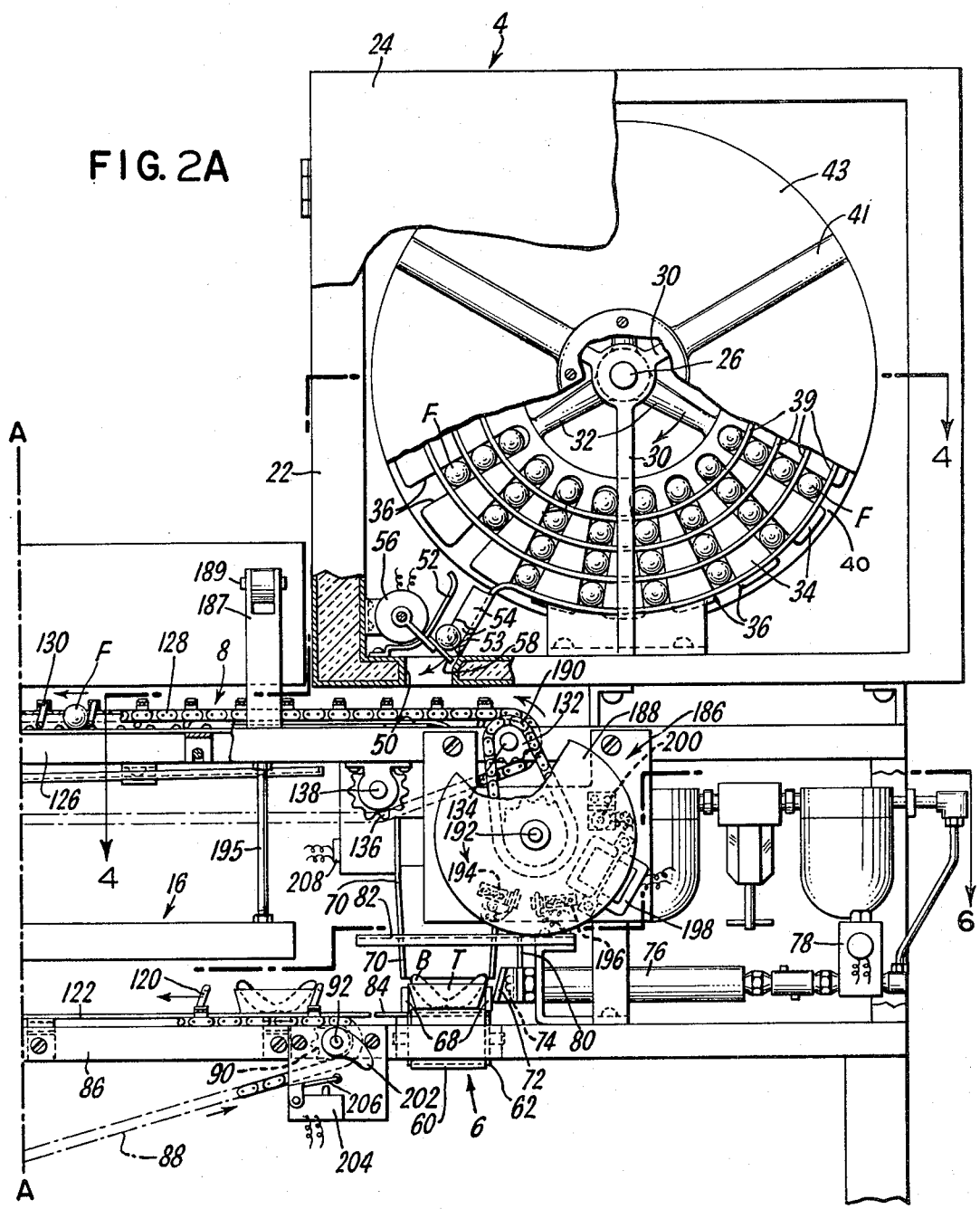
Figure 3:
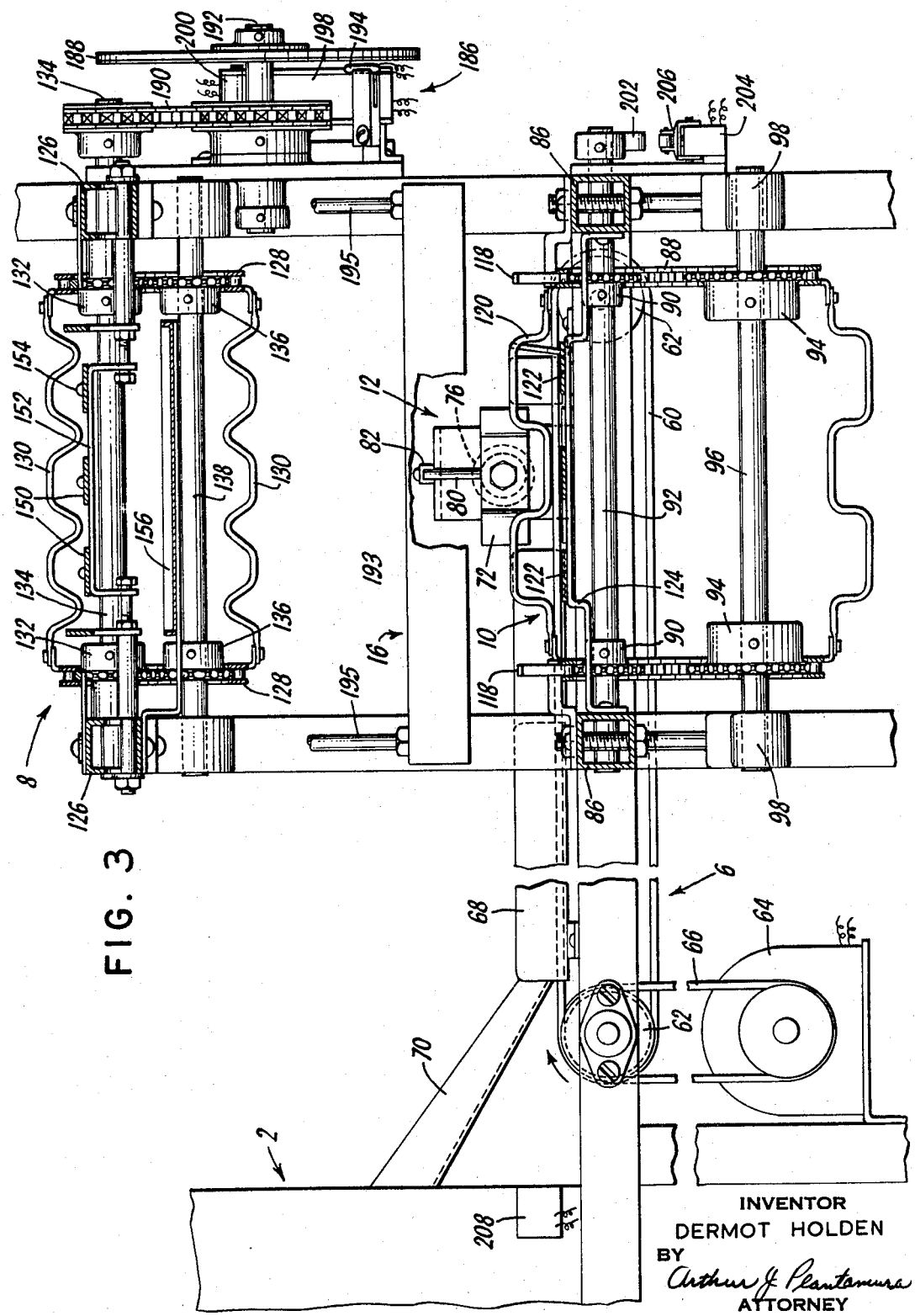
FIG. 3 is a transverse section taken as indicated by lines 3—3 in FIG. 2.

FIG. 13 taken along line 13—13 of FIG. 10 illustrates the drive for the upper frankfurter and lower bread roll conveyors.

FIG. 14 taken along line 14—14 of FIG. 10 illustrates the frankfurter transfer gate drive mechanism.

FIG. 15 is a side front elevational view taken along line 15—15 of FIG. 14 illustrating the frankfurter pusher and its relationship to the support tray.

FIG. 16 is a plan view of the arrangement illustrated in FIG. 15.

FIG. 17 is an elevational view partially in section illustrating an alternate rotary dispenser.

FIG. 18 is a sectional view taken along line 18—18 of FIG. 17 showing the rotary element detached from the drive hub.

FIG. 19 is a fragmentary view similar to FIG. 18 showing the parts assembled.

FIG. 20 is a view taken along line 20—20 of FIG. 18 illustrating the drive control for the frankfurter dispenser.

FIG. 21 is a schematic wiring diagram for the embodiment of FIGS. 9–20.

The novel apparatus of the invention includes the capability of receiving frankfurters and buns separately and cooking and dispensing the assembled parts fully automatically or semi-automatically. More specifically, the apparatus of the invention has the following capabilities: (a) to store edible portions of meat or the like, such as frankfurters, under controlled temperature and sanitary conditions, (b) to store also bread items such as buns, preferably in disposable tray type containers, under proper temperature and sanitary conditions, (c) upon demand, to dispense a bread item and meat item and simultaneously cook them, and (d) to assemble the meat item with the bread item and deliver the assembled unit to a receiving station or conveyor. Additionally this apparatus may be equipped to be keyed into a system in which the machine is remotely actuated electronically with other automatic food and drink preparation machines to offer a suitable menu as illustrated for example in FIG. 1.

In that diagram, the machine of the invention is designated A1 and is shown in conjunction with two other machines A2 and A3, examples of which may be, for example, described in the pending application of Udall et al. S.N. 220,615, "Food Preparing Apparatus and Method" and that in U.S. Patent 2,284,880. Generally the system functions as follows:

Orders from outside sources such as a dining room D and an outside drive-in parking lot O, are received by an attendant generally through remote voice communication at console C. The attendant enters the order into the console and thereby actuates the printer P which prints out a chack. The printer is conveniently situated contiguous to the assembly area E. The console C simultaneously enters the food orders into the memory M1, M2 or M3 for the appropriate machines A1, A2 and A3, respectively. The memory unit serves to rapidly accept and store or backlog a quantity of orders and feeds the order individually into the machines when the machine is capable of accepting an order. As the order is accepted by the machine the backlog stored in the memory is reduced by that unit in process. A bank of electric order counters G records and provides a readout of the number of orders passing through each machine to aid in inventory and machine replenishment schedules. The order and billing system likewise total the amount of billings.

After the order processed by the machine is delivered to the assembly area and assembled with its corresponding printed check it is delivered by an attendant to the ordering customer. Greater details of a suitable electronic ordering and billing system useful in conjunction with the invention is described in greater detail in the pending U.S. patent application of Alpert et al. S.N. 219,222, entitled, "Electronic Ordering, Price Computing and Billing System."

Referring to the drawings and to the embodiment illustrated in FIGS. 2–7, the bread products are oblong frankfurter ("hot dog") rolls, designated B, which are stored, handled and heated while contained in disposable trays or "boats" designated T which may be automatically dispensed from articulated storage units as by the means described in the pending U.S. patent application S.N. 285,742. These trays may be formed of paper, plastic or metallic foil materials, or a combination thereof. The meat product in this case is the frankfurter, designated F, which is to be cooked, e.g. broiled, and then placed in the bun B. It will be apparent that the apparatus may be adapted for use with food products of adaptable configuration, other than frankfurters. The principal parts of the machine for performing the steps in many respects is similar in both the embodiments of FIGS. 2–7 and that of FIGS. 8–19 and will be described generally before describing them in detail. Initial reference for this purpose is made to the embodiment of FIGS. 2–7.

A supply of buns B in their individual trays T is stored in an automatic dispenser 2 (FIG. 6). The frankfurters F are stored in an automatic rotary dispenser 4. A tray T carrying a bun B ejected from dispenser 2 is received on a conveyor 6 and carried thereby to a transfer station 12, at which it is transferred onto a conveyor 10 which carries the contained bun beneath a heater 16. A frankfurter F released from dispenser 4 is dropped onto a conveyor 8 which carries it beneath a broiler 14. The heating element housed in 14 (as well as in bun heater or toaster 16) preferably comprises a quartz plate heated by an electric resistance wire, e.g. nichrome, which resists accumulations of fat or other matter. At the left end of the machine (as viewed in FIG. 2) the cooked frankfurter F is dropped into the bun B by mechanism generally indicated at 18, the assembled unit then being delivered to a discharge conveyor 20.

Referring to FIGS. 2A and 4, the frankfurter dispenser 4 has a cabinet comprising insulated walls 22 and a cabinet door 24 at one side. This cabinet is insulated to permit maintenance of controlled temperature as may be necessary in storage of a particular product. In the present case, this cabinet is refrigerated by conventional means (not shown) for preserving the frankfurters. The frankfurter storage magazine comprises a horizontal shaft 26 journalled at one end in a bearing 28, and at the other end in a fixed spider member 30. Keyed to shaft 26 in side-by-side relation are rotatable elements or wheels 32 having lobes 34 defining a plurality of uniformly spaced radial slots 36 into which frankfurters are placed. At opposite sides of the wheels 32 there are helices 38 and 39 which are fixed relative to wheels 32 and in which the frankfurters are stored and pushed in a spiral path by the lobes 34. The helices 38 and 39 are mounted upon a spider member 30. It will be noted that the slots 34 in the adjacent wheels 32 are in alignment, and that the convolutions of the opposite vanes 38 and 39 are also in alignment. At the back of the dispenser there is a circular plate 40 (FIG. 4) which abuts the edge of spiral vane 38. At the front of the dispenser, a similar circular plate 43 is mounted on the door 24, whereby opening of the door removes the covering plate 43 and exposes the internal rotary assembly. Channels 41 formed in cover plate 43 provide space for the spider 30.

Shaft 26 is driven through gearing 45 from a motor and speed-reduction unit 42. Affixed to the end of shaft 26 is a switch actuating cam 44 having a series of depressions and lobes thereon. Cam 44 operates a pair of switches 46 and 48, it being noted that while the state of one switch is determined by a depression, the state of the other switch is determined by a high point. The operation of these controls will be described more fully hereafter.

In the lower wall of the cabinet there is a door or opening 50 through which a frankfurter can be deposited on conveyor 8. The outer terminal ends 53 of the spiral vanes 39 are directed downwardly toward opening 50 and are provided with side extensions 54. Together with a spaced guide plate 52, the vane end portions 53 and sides 40 define a chute adapted to receive a frankfurter delivered from one of the slots 36. A gate 58 is rotatably mounted for operation by a rotary solenoid 56 or similar device or mechanism. The gate 58 normally is in the position shown in FIG. 2A, whereby it obstructs the passage of a frankfurter through opening 50 and onto conveyor 8; upon energization of solenoid 56, the gate 58 is moved in a clockwise direction (FIG. 2A) through an angle of about 45 degrees to a position wherein gate 58 contacts the edge of opening 50 so that such passage and delivery action is permitted.

The conveyor 6 comprises an endless belt 60 which travels about a pair of pulleys 62 and is driven by a motor 64 through belt drive 66. The upper reach of the belt 60 is supported by a pan 68. A disposable tray T containing a bun is delivered onto belt 60 through a chute 70 leading from a dispenser 2. Control aspects involving delivery of the bun from dispenser 2 will be described hereafter. The dispenser 2 may comprise a dispenser of the kind disclosed, for example, in the copending applications of Bardy et al., S.N. 284,456, filed May 31, 1963, and Austin et al., S.N. 306,914, filed Sept. 5, 1963, in which items are horizontally dispensed from vertically indexed shelves although it will be apparent various other bun storage and feeding mechanisms may be used in lieu thereof.

The transfer station 12 comprises essentially a pusher 72 which is reciprocable by means of the rod 74 of a pneumatic piston and cylinder unit 76 and conventionally associated oiler pressure regulator and filter elements 76a, 76b, and 76c, respectively. Operation of the unit 76 is controlled by solenoid valve 78, as described more fully hereafter. The piston rod 74 is provided with an upwardly extending pin 80 which slides within a guide 82 during reciprocating motion. A plate 84 beneath belt 60 extends outwardly toward conveyor 10 to act as a slide for transfer of a bun in a tary.

The conveyor 10 is constructed within a bed or framework indicated at 86. The basic carrier elements are two chains 88 which travel and are driven about several sets of sprockets. Sprockets 90 are keyed to a shaft 92 which is journalled in bearings on the frame; sprockets 94 are keyed to a shaft 96 which is journalled in bearings 98 that are suspended from the framework; sprockets 100 are keyed to a shaft 102 journalled in bearing blocks 104; sprockets 106 are keyed to a shaft 108 journalled in bearings 110. At one end of shaft 108, there is affixed a sprocket 112 by means of which shaft 108 is driven from a motor 116 through chain 114. Thus, the conveyor 10 is driven by the sprockets 106 on shaft 108.

Along their upper reach, the chains 88 are guided by fixed shoes 118 to travel in a horizontal and then upwardly inclined path. The detachable conveyor flights or pusher elements are constituted by bent rods 120, each of which is secured at its ends to the chains 88. Beneath the path of travel of pusher elements 120 are runners 122 which are secured to frame cross members 124. Thus, as a tray containing a bun is advanced by a pusher 120, it is supported by and slides upon the runners 122.

The upper conveyor 8 is arranged in a framework including main side members 126, and its principal parts are a pair of parallel conveyor chains 128 having connected between them a plurality of detachable flights or pusher elements 130 which are preferably angularly disposed to aid in rotating the frankfurter as it is pushed along. Chains 128 travel about idler sprockets 132 on shaft 134, idler sprockets 136 on shaft 138, idler sprockets 140 on shaft 142 and driving sprockets 144 keyed to shaft 146. Shaft 146 is driven by the motor 116 through a chain drive 148 and the previously mentioned chain drive 114. Beneath the upper run of conveyor 8, parallel runners 150 are mounted on transverse brackets 152. A plurality of spaced protuberances or bumps 154 are preferably placed along the length of runners 150. These bumps 154 give the runners 150 an undulated characteristic and can be separate elements attached to the runners or can be machined or stamped therein in the course of manufacture. The purpose of bumps 154 is to engage the lower portion of a frankfurter F and insure its turning or rolling movement as it is advanced by the pusher elements 130, whereby its complete surface is exposed to the broiling heat. Beneath the runners 150 and extending along their length is preferably positioned a drip pan 156, adapted to catch fat dripping from the frankfurters F.

Inclined downwardly from beneath the delivery end of conveyor 8 is a stationary ramp plate 158. A guide plate 160 also stationarily mounted curves downwardly in outwardly spaced relation to the curved path of travel of conveyor 8 about its shaft 146. Thus, as a frankfurter is advanced to the transfer section 18, it travels within the guide plate 160 and is deposited in a recess formed by the ramp plate 158 and a pivotable gate 162. Gate 162 and plate 158 cooperate (see FIG. 2) to support the transferred frankfurter until it is released by a suitably timed camming action which opens the gate 162. The gate 162 is affixed to a transverse shaft 164 which is biased in counterclockwise direction by a tension spring 168 which is connected between its extension arm 166 and a fixed pin 170, whereby gate 162 normally assumes the position shown in FIG. 2. For operating the gate 162 in the opposite (clockwise) direction to drop a frankfurter therefrom, the shaft 164 has a radial arm 172 which carries a cam follower roller 174. A cam arm 176 is keyed to a shaft 178 which is driven in synchronism with lower conveyor 10 by a chain drive 180. Cam arm 176 makes one revolution during the travel of upper conveyor 8 a distance equal to the spacing of adjacent pusher elements 130. In the design of the machine which involves the fixed relation in timing of the conveyors 8 and 10 because of the direct interconnecting drive 148, the upper conveyor 8 is capable of delivering one frankfurter F to the transfer section 18 for each assembled tray T and bun B delivered by the lower conveyor 10. The timing of the rotation of cam arm 176 through drive connection 180 is such that arm 176 engages cam follower 174 at exactly the proper moment to effect dropping a frankfurter into a bun B.

As the tray T carrying bun B moves beneath the ramp plate 158 and gate 162, the frankfurter F is thereby deposited in the bun and this completed assembly advances toward the end of plate 122 and slides downwardly on a chute 182 to be deposited upon the belt 184 of conveyor 20. Conveyor 20 typically leads to a station where a completed frankfurter is assembled with other parts of a customer's order, such as beverages and french-fried foods, for delivery to the customer.

The broiler 14 comprises any suitable cooking arrangement such as an infra-red type radiant heating element of commercially available kind (not shown) or such as induction type heating units, or quartz heaters, which resist accumulation of fats, food particles, etc., and need a minimum of cleaning, housed in the enclosure 191, the bottom portion thereof being open to heating rays directed downwardly against frankfurters F on the conveyor 8. The assembly 191 is advantageously connected to supporting brackets 187 by hinges 189, whereby it may be swung upwardly to expose its interior for cleaning and servicing and to provide better access to the conveyor 8 for the same purposes. The heater 16 is in the nature of a toaster and is optionally utilized. Heater 16 generally has a much lower heating capacity than the broiler 14 and is for the purpose of toasting or warming the buns B passing therebeneath. Heater 16 also has a cover 193 over a conventional heating element (not shown) and is supported from the machine framework by hangers 195.

Referring particularly to FIG. 4A a suitable means for the controls for this machine is illustrated. The arrangement 186 comprises a programming unit provided with a magnetic recording disc 188 mounted on a shaft 192 which is rotatably driven from the shaft 134 (hereinbefore described as the mounting for sprocket 132 which carries chain 128, FIG. 2A) through a chain drive 190. Disc 188 rotates in counterclockwise direction. In progression about the path of travel a given spot which has been created thereon by spotting coil 200 passes (in order)

a reed switch 194, reed switch 196 and erase head 198. The reed switches 194 and 196 are conventional components and are actuated to a closed condition in response to sensing of a magnetized spot. The spotting coil 200 is operative to create on the disc 188 a magnetized spot which will be sensed by the reed switches 194 and 196. Further aspects of the operation of programming unit 186 will be described hereafter.

On shaft 92, which rotates in timed relationship with the movement of lower conveyor 10, there is secured a cam 202 which on each revolution depresses the actuating arm 206 of a timing switch 204. A further element in the machine control circuit (considered hereinafter) is a relay associated with the bun dispenser 2 which, when energized, signals the delivery of a tray and bun from the dispenser.

The first step in the operation of the machine is the input of a signal as from the console C in FIG. 1 demanding that it produce the assembled product (i.e. a cooked frankfurter in a heated or toasted roll). When this signal is received from an automatic ordering system it comprises the closing of a switch S1, or, if the signal is manually effected by a machine operation, it comprises the closing of a switch S2 (considered hereinafter in connection with FIG. 8). This input signal merely conditions the machine for operation, and the initiating of its operation actually takes place when the cam 202 next closes timing switch 204. The closing of switch 204 then effects energization of solenoid 56 causing a frankfurter F to be dropped onto conveyor 8; also, it energizes coil 200 to produce a magnetic spot on disc 188 and initiates operation of motor 42 to rotate the dispenser and bring another frankfurter F into position for delivery during the next cycle of operation.

The frankfurter F which has been dispensed is conveyed by a pusher element 130 beneath the broiler 14, being rotated in the course of travel by means of the bumps 154. As this frankfurter F has completed about half of its trip beneath the broiler 14, the magnetic spot on disc 188 reaches the location of reed switch 194 which then closes to activate bun dispenser relay shown as D1 in FIGURE 8B. A bun B in a tray T is then delivered by the dispenser actuator onto conveyor 60 by transfer mechanism 76 and travels to the location opposite transfer station 12. Shortly after the time that the bun and tray reach station 12, the magnetic spot reaches reed switch 196 which closes and causes solenoid valve 78 to be energized. This energization causes piston and cylinder unit 76 to undergo an outward and inward reciprocation, thereby transferring the tray and bun to the conveyor 10.

The speed of conveyor 10 is such that a bun which may be toasted or warmed by heater 16 arrives at assembly mechanism 18 at or prior to the time that the frankfurter F has arrived. Thus, as previously described, the rotation of cam arm 176 then opens gate 162 at exactly the proper instant to drop the frankfurter into the bun. It should be noted that during this operation, as soon as the frankfurter F has been delivered to the conveyor 8 and magnetic "order" spot has been produced by coil 200, the machine is prepared to accept a further order.

Figure 8A:
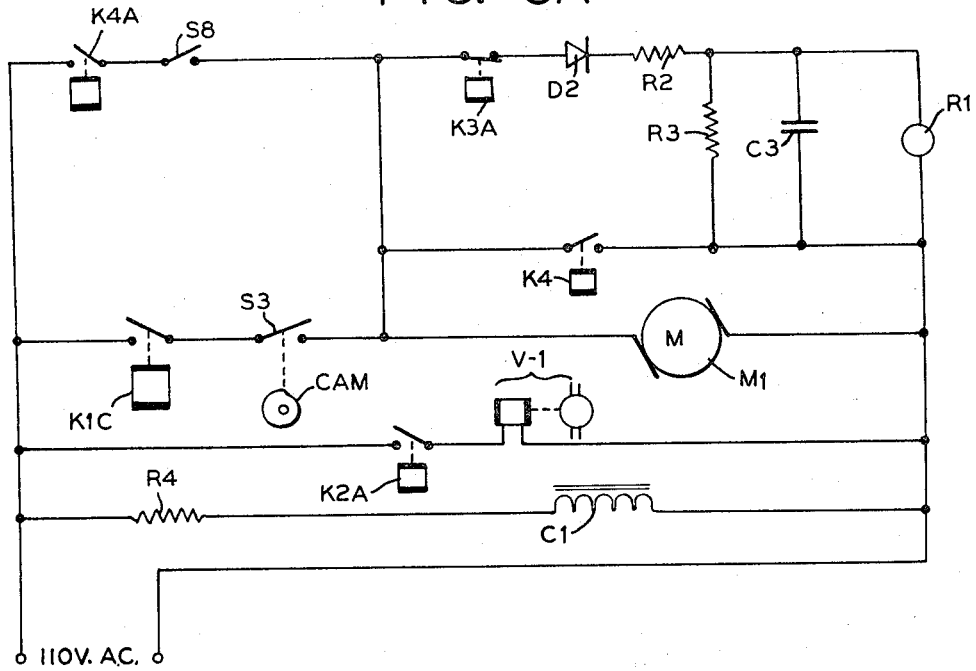
FIGS. 8A and 8B are schematic wiring diagrams in two parts for the embodiment of FIGS. 2–7.
Figure 8B:
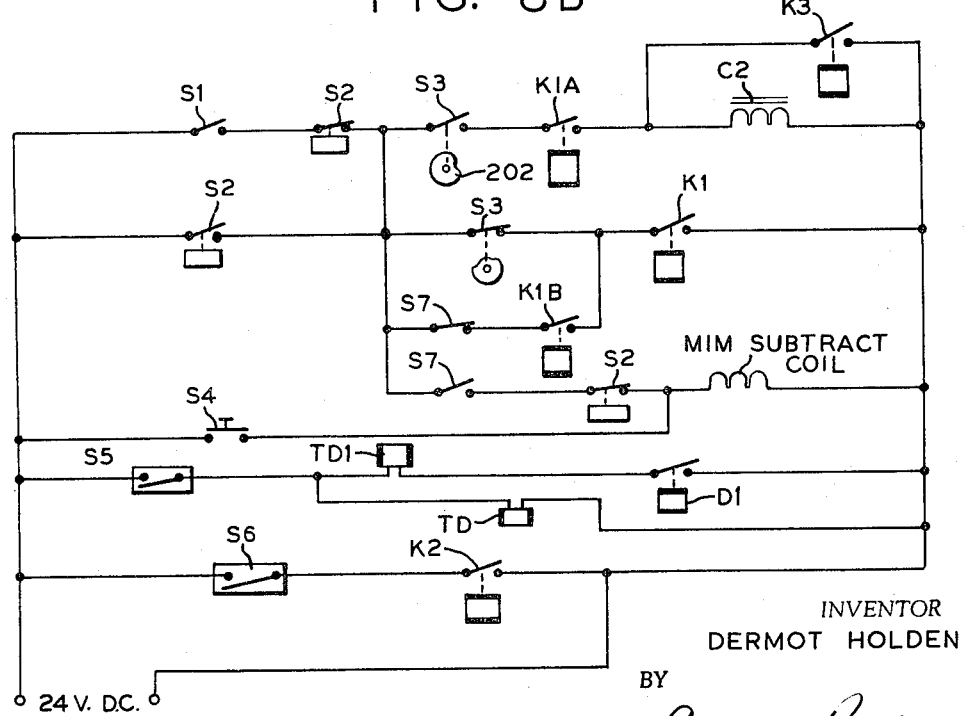

By reference to the electrical diagram of FIGS. 8A and 8B, the functioning of the machine of FIGS. 2–7, either as an integral part of a system such as shown in FIG. 1 or independently as a separate machine, will be more apparent to those skilled in the art. The machine will be described in the automatic mode, changes for the manual mode being apparent from the description taken in conjunction with the diagram.

FIGS. 8A and 8B depict the electrical diagram in two segments for the machine of FIGS. 2–7; the part shown by FIG. 8A is basically the power circuit which is capable of utilizing alternating current at standard voltage while FIG. 8B is basically the control circuit which employs low voltage direct current for the circuit of FIG. 8B Power for the circuit of FIG. 8B may be supplied by an outside source as shown or it may be derived from the alternating current supply feeding the circuit of FIG. 8B by utilizing a transformer rectifier combination.

With the automatic-manual mode switch S2 on automatic (as shown), an order for one or more frankfurters from the ordering and billing system such as that of the hereinbefore noted application S.N. 219,222, will run up the menu inventory memory (MIM) to read the desired number of orders and this will close switch S1 inside of the menu inventory memory. With S1 and S2 closed, power is supplied through the normally closed contacts of switch S3 to the coils of the K1 relay.

With the K1 relay closed (and sealed by its own contact K1B), the electrical circuits of the machine is "cocked" and waiting for the timing switch S3 to be actuated by the timing cam. This occurs when the upper conveyor 8 is in position to recive the frankfurter F.

When the timing cam 202 actuates the switch S3, the following occur:

(a) Power flows through switch S3 and relay unit contact K1A to the spotting coil C2 of the memory unit 186 shown in FIG. 4A; this induces a magnetized spot on the rotating memory disc 188.

(b) Power flows to the coil of relay K3 which closes (K3A) the circuit supplying DC power to the solenoid which drops the frankfurter F from the dispenser 43.

(c) Power flows to the frankfurter dispenser drive motor 42 shown in FIG. 8A as M1 which brings another frankfurter into dispensing position.

(d) K4 relay closes.

As the timing cam 202 turns further, the S3 switch is de-actuated which discontinues power to the spotting magnet or coil C1 (shown at 200 in FIG. 4A) and to the rotary solenoid R1. The frankfurter dispenser motor M1 is still running but its power now flows through relay contact K4A and wheel index switch S8.

As the frankfurter dispenser wheel 32 turns, switches S7 and S8 are actuated. The actuation of switch S7 opens relay K1 and subtracts one order indication from the MIM. The actuation of switch S8 continues power to the motor M1 which drives the frankfurter dispenser wheel. The frankfurter dispenser wheel continues to turn until the serrated wheel or cam 44 on the same shaft repositions switches S7 and S8 which de-energize the MIM subtract coil and interrupt power to motor M1, respectively.

The machine has dispensed a frankfurter and the order for a bun has been memorized in the form of a spot on the memory wheel 186. The machine is therefore prepared to accept another order. At about the time the frankfurter is half cooked, the spot on the memory wheel passes under and energizes reed switch S5. When the switch S5 is closed, relay coil D1 is energized and its associated contact provides power to the bun dispenser 2 which dispenses one bun. The time delay relay TD is utilized merely to open the circuit after a short period of time to prevent two buns from being dispensed from a single magnetic spot. The dispensed bun B arrives at the lower conveyor and waits until the magnetic spot moves under reed switch S6.

When the magnetic spot energizes reed switch S6 power is supplied to relay K2 whose contact K2A allows power to flow to solenoid valve V–1. When the solenoid air valve V–1 is energized, air pressure operates a cylinder which pushes the bun (in its boat) onto the lower conveyor. The frankfurter and bun are now both in process. The magnetic spot continues to rotate until it passes under the erase coil C–1 and is erased.

Whereas in the embodiment of the invention described in connection with FIGS. 2–8, operations of the dispensing and cooking apparatus depends for coordinate functioning of various operations, an internal memory system, and to a relatively greater extent on electrical and pneumatic functions, the embodiment of FIGS. 9–21 employs, in lieu thereof, essentially mechanically coordinated functions.

Referring to FIGS. 9 and 10, this embodiment includes a frame 210 having mounted adjacent thereto in operable relationship a bun storage cabinet 211 and a frankfurter storage cabinet 212. Buns fed from 211 and frankfurters from 212 are carried by conveyors 215 and 216, respectively, past a cooking zone 217 to the assembly area 218 from whence the assembled product is delivered onto a carry away conveyor 295.

As noted as hereinabove, the dispenser 211 and its operation is described in greater detail in the heretofore noted copending application of Bardy et al., S.N. 284,456, and Austin et al., S.N. 306,914. A bun preferably in a paper boat or tray T dispensed from 211 is deposited on a transition chute 221 and slides onto a conveyor belt 222 which is suitably driven as by a motor 223. Guides 224 and 225 and stop 224a function in cooperation with the conveyor 222 to deliver the bun at the appropriate position for transfer onto the conveyor 215.

The transfer means for depositing the bun on the lower conveyor 215 is shown in greater detail in FIG. 11 and comprises a bar linkage arrangement 226. The crank 227 of this linkage is suitably driven as by connection through chain 228 shown by phantom line to a sprocket 229 which with sprocket 291 at the other end comprise the elements on which the driven conveyor 215 is mounted. The crank 227 is secured to and rotates with shaft 231 on which the crank 227 is mounted. The shaft 231 is keyed to and driven by means of a sprocket 232 which in turn is connected (for rotary movement) to the sprocket 229 of conveyor 215. The crank 227 is pivotally connected at 234 to a coupler bar 233 which in turn is pivotally connected at 235 to the lever 236. Lever 236 is pivotally connected at its lower extremity to a fixed pivot point 237. The linkages 227, 233 and 236 are positioned at the side of conveyor 215. The coupler bar 233, however, carries at its free end (right end as shown in FIG. 11) a pusher bar 238 which extends (away from the plane of the paper as shown in FIG. 12) over the conveyor at the place where the bread roll and tray T is deposited (see FIG. 10). The bar 238 is suitably contoured to clear the stop 224a. The path circumscribed by bar 238 as the linkage 226 is actuated is shown by dotted line 239 in FIG. 11. As the crank 227 rotates through an arc of 360°, the coupler bar 233 causes the crank 236 to oscillate. This provides a continuous movement of the pusher 238 whether or not a bun is awaiting transfer. Each motion to the left as shown in FIG. 11 acts to transfer a waiting bun B onto the conveyor 215 if such bun is present. The path 239 is such that on the return movement after a bun has been pushed onto the conveyor 215, the pusher 238 passes (on the return cycle) above any subsequent bun which has in the meantime been positioned on conveyor 222 for delivery to the conveyor 215. The mechanism 226 is synchronized with conveyor 215 to introduce the boat T at correct position between two of the pushers 214 which are secured to and move so long as conveyor 215 is in motion.

A highly advantageous feature of this embodiment resides in the elimination of any internal memory system so that as a frankfurter F is deposited on the conveyor 216, a bun B is simultaneously positioned on the conveyor 215.

The frankfurter storage unit 212 as shown in greater detail in FIGS. 17–20 includes a refrigerator 245 which houses a circular frankfurter magazine 246. Magazine 246 comprises a plurality of concentrically positioned fixed rings 247, three of which are shown, and a rotating vaned element or wheel 248 having a plurality of vanes 249 which rotate between rings 247, i.e. when wheel 248 is assembled the vanes interfit between rings 247 so that the combination of the vanes 249 and rings 247 forms compartments for, and at the same time the vanes act as pushers which sequentially feed, the individual frankfurters F. The vaned wheel 248 is conveniently provided with an inner annular securing flange 250 and also as a matter of convenience carries integrally formed therewith the first or inner annular ring 263. The rotating wheel 248 is attached to the driven hub 251. Secured to the hub 251, or formed integrally with the hub on which the rotating element or wheel 248 is attached, is a securing bar 252. Bar 252 is equipped at its extremities with L-shaped securing lugs 253. The lugs 253 are designed so that when the L-portion 254 thereof extends inwardly toward the hub 251 as shown in FIG. 18, the vaned wheel 248 may be withdrawn, and thereby detached, in an axial direction the first or inner annular ring 263. The rotating wheel 248 is in place on hub 251, the L-shaped portion 254 of lugs 253 are rotated outwardly to securely hold it in place on the hub 251 and thereby rotated by motor 255 through shaft 256. Rotation of shaft 256, accordingly, moves the compartment separating vanes 249 relative to the stationary rings 247a and 247b.

Shaft 256 also carries a serrated wheel 257 (see FIGS. 18 and 20) which functions as a drive control to index the vaned wheel 248 in correspondence with the delivery chute 265. Indexing is effected by detent plunger 258 whose spring loaded detent 259 fits into serrations 260 of the wheel 257. A control switch 261 is arranged so as to provide a completed circuit, when the actuator is removed from a low point in a serration 260, to carry the vaned wheel through one index after the circuit has been initiated (as hereinafter described) by a timing switch 240 adjacent conveyor 215. The actuator arm 262 causes the circuit to be open when extended into one of the serrations 260; the circuit being closed when actuator 262 is on one of the peaks between serrations 260.

When one of the outer chambers 264 is in registration with exit chute 265, a frankfurter F falls by gravity through an interruption 266 in the outer ring 247a. The frankfurter may be aided in maintaining a horizontal position as it is delivered by forming the chute so that it has a tortuous path; this resists out-of-horizontal position of the frankfurter, and assists in correctly depositing on the conveyor 216 and avoids the possibility that the frankfurter will "hang" in the chute.

As the motor indexes another chamber 264 into registration with the chute, a previously emptied outer chamber is refilled by a frankfurter F which passes by gravity through an opening 267 from the next inner ring 247b. It is thus seen that as the previously emptied chamber again comes into registration with the chute 265, the chamber has been replenished from the inner ring. This arrangement as well as that housed in the dispenser 4 of FIGS. 2–7 has the advantage that a frankfurter already in the magazine when it is reloaded will be dispensed prior to after loaded frankfurters, i.e. on a first-in first-out cycle. It will be apparent that while only two rings 247a and 247b are illustrated, the capacity of magazine 246 may be increased by employing additional similar concentric rings.

The frankfurters F are deposited onto a conveyor-tray (see FIGS. 15 and 16) which is situated between chains 271 of the conveyor 216. The chains 271 are suitably mounted on sprockets 268 and 269. The tray 270 is fixed and as the frankfurters are deposited thereon, they are borne through the cooking zone by pushers 272 which are preferably removably secured to chains 271. The tray 270 may have any suitable cross-section and is preferably formed so as to have lands or high points 273 and grooves or low areas 274. The bottom edge of pusher 272 is preferably designed to conform with the configuration of the tray 270 (as shown in FIG. 15). Preferably the high points or lands 273 are provided along the length thereof with projections 275 to insure that the frankfurter rotates rather than skids as it is pushed and conveyed toward the assembly end 218.

Pushers 272 are also preferably contoured as shown in FIG. 16 with a concave leading face so as to urge the frankfurter to remain in the center of tray 270. An advantageous feature of pushers 272 is that they are designed to easy manual removal at the ends 276 and 277 thereof. The removal is effected by lifting, against a spring-positioned retainer 278, the end 276 and thereby off-setting the force of a spring 279 of the retainer 278, and then (as shown in FIG. 15), sliding the pusher 272 to the left so that the open end 277 slides out from under a retaining pin 280.

The frankfurters F on conveyor 216 are rotatably moved through section 217 beneath a suitable heating element which broils the frankfurter. The heating element 281 preferably comprises a quartz heating plate 282 which is heated by an electric resistance heating wire 283, e.g. nichrome. Situated below the conveyor 216 may be optionally positioned a second heating element 284 for the purpose of toasting the bun if this is desired. The element 284 is essentially similar in configuration to element 281 but generally is designed to radiate heat of lesser intensity.

It will be seen that the frankfurter F is broiled as it passes beneath the heating element 281 at the same time the bun B is lightly toasted as the conveyor 215 carried it beneath the toasting unit 284. The pushers 214 (similar to rods 120 in FIG. 2) are designed and secured on conveyor 215 essentially as described in connection with the embodiment of FIGS. 2-8. The conveyors 215 and 216 are synchronized so as to deliver the frankfurter F and bun B at the assembly area 218 in timed relationship.

By reference to FIG. 14, the assembly arrangement in section 218 is shown in greater detail. As the frankfurter F is carried to the end of the conveyor 216, it is deposited into a transfer section in which there is a stop plate 285 and a gate member 286. The gate 286 is mechanically operated through linkage from the main drive system. The gate 286 is driven by a crank 287 through a series of intermediate links 288, 289 and 290. The crank 287 in turn is driven on a common shaft 292 with sprocket 291 of the lower conveyor 215. The gate continuously oscillates (between the solid line and broken line position 286a as shown in phantom in FIG. 14) with respect to the stop plate 285 opening a gap between the two members allowing the frankfurter to fall by gravity into the waiting bun B. In the linkage shown in FIG. 14, pivot points 292 and 292a are fixed whereas pivot points 292b, 292c and 292d are movable. The motion opening the gate 286 is timed to precisely drop the frankfurter into the roll B which in turn is timed to appear beneath the transfer gate 286 to receive it. A suitable drive means motor 296 which is common to both conveyors 215 and 216 is illustrated in FIG. 13. A sprocket 296a on the motor output shaft by chain 297 connects to driven sprockets 298 and 299 which are connected respectively to the shafts for drives for conveyors 215 and 216.

The frankfurter F assembled in the bun B is now pushed by 214 onto a delivery or take-away conveyor 295 as the pusher 214 reverses direction on sprocket 291. The conveyor 295 is suitably driven as by a motor 293. To center the assembled frankfurter F on the take-away conveyor 295, a plow 294 (shown in FIG. 11) may be employed. The asembled product is now delivered to the assembly area E illustrated in FIG. 1.

The electrical interconnection and functioning of the machine of FIGS. 9-20 is further described by reference to the circuit diagram of FIG. 21.

The circuit consists of a number of switches wherein S1 is the vertical index arming switch and is operated by the horizontal index motor of the bun dispenser 211 whose details are illustrated in the description thereof set forth in the hereinbefore noted U.S. patent application S.N. 284,456, as the last bun from a given shelf of the bun dispenser is dispensed. S2 is described as the mode switch; it is actually a four-position six-pole selector switch illustrated within the bracketed portion 300 in the lower left hand of the drawing.

The six poles of S2 are labelled SB1, SB2, SB3, SB4, SB5 and SB6. The legend made up of O's and X's above each of the six poles indicates, by the X, the position in which that pole of the switch is closed, while the O represents an open position. For example, for the pole SB3, the third is the closed position; for SB1, the first is the closed position, etc. The left hand or first position of the selector switch is the manual position; the second position is the off-position; the third position is the load position; and the fourth or extreme right position is the automatic position.

Switch S3, a two pole double throw switch, is the vertical index switch and is operated by the vertical index motor of bun storage automatic dispensing unit 211 as it is lowering the bun supporting shelves in the dispenser. S4 is the conveyor synchronizing switch and is operated in synchronization with the frankfurter conveyor 216 so that for each discrete position on the conveyor 216 the switch S4 is actuated once. Switch S5 is operated by the motor 255 which dispenses frankfurters from the wheel 248 in refrigerated compartment 212 onto the conveyor 216. It operates each time a frankfurter F is dispensed. S6 also a two pole switch is operated by the horizontal index motor of the bun dispenser 211 the details of which are set out in U.S. patent application S.N. 284,456. Switch S6 operates at the start of each bun dispensing cycle and returns it to its normal position at the completion of the bun dispensing cycle. S7 is the menu inventor memory (MIMS) subtract switch and is operated just before the completion of a bun dispensing cycle by the bun dispensing horizontal index motor.

Illustrated at 301 is a load (three pole) push-button which functions to place the first shelf of buns in the proper position after the bun dispenser has been loaded. Three relays and three motors are included in the circuit: K1 the automatic relay; K2 the vertical index relay; and K3 the synchronizing relay; B1, the frankfurter wheel motor which dispenses the frankfurters from the refrigerated compartment; B2 the horizontal index motor which operates the horizontal pushers for dispensing the buns from the storage shelves in unit 211; and B3 the vertical index motor in the bun dispenser which moves the storage shelves in the bun dispenser to the correctly aligned vertical position. Additional motors (not shown) include a motor 296 to drive the frankfurter conveyor 216 and bun conveyor 215 and the motor 223 for the conveyor 215 which carries the buns which have been dispensed from the bun storage unit to the toasting conveyor. Both of these motors are connected directly across the line and operate at any time the machine is turned on.

Included in the circuit is the automatic counter G, referred to in FIG. 1, to record items dispensed. A neon lamp LL which is generally on is used primarily in the loading condition.

In describing the operation by reference to FIG. 21, when the machine is turned on, power is supplied to the circuit to the terminals labelled 302 and 303. Thereupon the transformer T1 is energized and the secondary of transformer T1 supplies energy to relay K1. For the purpose of a more specific description, a specific mode will be considered wherein the selector switch S2 is in fourth position, i.e. the automatic position, so that contacts SB4, SB5 and SB6 of the selector switch are closed. The closing of contact SB4 supplies power to the rest of the circuit and turns neon lamp LL on. All switches shown are indicated in the at-rest position. The relay contacts are shown in the de-energized conditions of the relay.

When a frankfurter is ordered, the MIMS switch 304 shown in phantom across terminals 305 and 306 will be closed thereby energizing the relay K1 through the circuit consisting of the MIMS switch 304 and contact SB5 of the selector switch S2 which is now closed. When relay K1 is energized, contacts 308 and 307 of relay K1 will be closed. When the frankfurter conveyor 216 is in a position ready to receive a frankfurter from the refrigerated compartment 212, the conveyor synchronizing switch S4 shown as 240 in FIG. 12 will close and relay K3 will be energized through the circuit consisting of normally closed switches S3–2 and the closing of normally open switch S4, closed contact 312 of relay K2, and contact 308 of relay K1 which has just closed.

Energizing of K3 will close its contacts 309, 310 and 311. The closing of contact 309 provides a holding circuit for relay K3 through the circuit consisting of S5, normally closed, and contact 309. The closing of contact 310 causes the horizontal index motor of the bun dispenser to run through the circuit consisting of S3–2 normally closed, normally closed contact 314 of relay K2 and contact 310 of relay K3. After the horizontal index motor B2 starts to run, switch S6 is actuated closing the normally open contact of S6–1 and opening normally closed contacts S6–1 and S6–2. Opening contact S6–2 prevents K3 from becoming re-energized until the dispensing movement of the bun is completed while opening contact of S6–1 prevents the motor which vertically indexes the shelves in the bun store 312 from operating while the horizontal index motor which feeds the individual buns from shelves from operating. The closing of the normally open contact of S6–1 provides a circuit for maintaining the operation of the horizontal index motor B2 until switch S6–1 again opens and returns to its normal position. Simultaneously it provides a circuit consisting of the normally open (but now closed) switch S6–1; closed relay contacts 307 and 311 to the automatic counter G; and by the same circuit, without relay contact 307, to the dog wheel motor B1. Operation of the frankfurter motor B1 causes a frankfurter in a position to be dispensed from the refrigerated compartment to be released to the conveyor 216.

Shortly after the motor B1 starts, it operates switch S5 thereby opening its normally closed contact and closing its normally open contact. Thereupon contact 309 is interrupted and relay K3 is therefore de-energized. Because S5 is closed motor B1 will continue to run. Similarly since switch S6–1 is closed, the horizontal index motor of the bun dispenser will continue to run. When the motor B1 has advanced the storage unit one compartment, switch S5 will return to its normal open position closing its normally closed contact and de-energizing the motor B1 and the automatic counter. This occurs normally before the completion of the horizontal index of the bun dispenser. The conveyor synchronizing switch S4 will also return to its normally open position before the completion of the horizontal index of the bun dispenser. Just prior to the completion of the horizontal index of the bun dispenser switch S7 will be actuated momentarily energizing relay K2. This will provide a subtract signal to the MIMS circuit through the normally open switch S7 contact (now closed) and contact SB6 of the selector switch S2. If there are no other orders stored in the MIMS unit at this time, the MIMS switch will also open, thereby de-energizing relay K1.

At the completion of the horizontal index therefore switch S6 will return to its normal position thereby de-energizing the horizontal index motor B2 by opening the normally open contact of S6–1. The circuit has now returned to its original condition. The foregoing description refers to the normal and most frequently encountered cycle. However, if the bun which was dispensed is the last of a given shelf, then just before the completion of the horizontal index of the bun dispenser while switch S6 was still closed, switch S1 is actuated thereby closing its normally open contact and providing a circuit to relay K2. S1 is actuated only momentarily. When S1 opens, K2 remains energized through the circuit consisting of the normally closed contact S3–2 and the now closed contact 313 of relay K2. Energizing of K2 opens its normally closed contacts 312, 314 and 316 and closes its normally open contact 315. The opening contact 312 prevents relay K3 from being energized regardless of whether K1 is energized and S4 is actuated at the completion of the horizontal index. With K2 energized at the completion of the horizontal index, which switch S6 returns to its normal postion, the vertical index motor B3 will be energized through the circuit consisting of the S6–1 normally closed contacts S6–1 and S3–1 and relay contact 315, now closed.

Shortly after motor B3 starts its operation switch S3 thereby opening its normally closed contacts S3–1 and S3–2 and closing its normally open contact S3–1. When contact S3–2 opens, relay K2 is de-energized since the circuit consisting of S3–2 and 313 is now interrupted. When relay K2 becomes de-energized the vertical index motor continues to operate through the circuit consisting of switch contact S6–1, normally closed, relay contact 316, normally closed, which is now closed, and switch contact S3–1, now closed. At the completion of the vertical index motion switch S3 returns to its normal position thereby opening contacts S3–1 and closing contacts S3–1 and S3–2 and the circuit is returned to its original condition.

Operation with the selector switch S2 in other positions is briefly described as follows: when it is in extreme left hand or first position, power is supplied to the circuit through the contact SB1 of the selector switch S2. At the same time, relay K1 is maintained in the energized position through contact SB2 of the selector switch S2. With K1 energized, the machine will continue to dispense hot dogs and buns as described in the fore-going explanation.

The second position of the selector switch S2, when no poles are closed, is the "off" or inoperative position of the machine.

The third position of selector switch S2 where pole SB3 is closed, is the load position. At this position, power is supplied to terminal 318 of the load pushbutton PBL which is shown with terminals 318–323. This position of the selector switch S2 is employed normally only when the lower shelf of the bun dispenser is empty, the rest of the bun dispenser having just been replenished. At this juncture as PBL is operated, the neon lamp LL will be energized through the circuit consisting of terminals 318 and 319 of pushbutton load switch 301, S3–2 and the neon lamp through its internal resistor. Similarly, the horizontal index motor B2 will be energized through the circuit consisting of PBL terminals 318 and 319, relay contact 314 and terminals 322 and 323 of load pushbutton 301. Motor B2 continues to run until it operates switch S1 at which time relay K2 will be energized through the circuit consisting of the terminals 318 and 319. Contacts of switch S3–2 and of S1 which are now closed. Once energized, K2 will remain energized through contacts 313 directly to terminal 319.

As noted hereinbefore S1 being S1 actuated only momentarily immediately reopens but when actuated, switch S6 is also actuated. The normally open contact 324 of S6–1 is closed and its not normally closed contacts 325 and S6–2 are open. S6–1 being closed, motor B2 will continue to run through the circuit consisting of 318, 319, 326 and 324 which is now closed, even though relay K2 has been energized and its normally closed contact 314 is open. However, the horizontal index will stop when S6 returns to its normal position since relay K2 is energized the vertical index motor will start through the circuit consistng of 325 relay contact 315 and the normally closed contact 327 of S3–1. Shortly after the motor B3 starts, switch S3 will be actuated thereby opening its contacts 327 and closing its normally open contact 326 will de-energize the neon lamp LL and all op- since relay K2 is still energized and contact 316 of the relay K2 is open. At the same time, the opening of contact 326 will re-energize the neon lamp LL and all operation of the bun dispenser 312 will therefor have stopped. Although the vertical index conveyor is now actually in a half-way position, when the pushbutton 301 is released and the selector switch S2 is turned to either the manual or automatic position, it may be readily seen that the vertical index will be completed through the circuit consisting of S6–1 normally closed; contact 316, which will not be closed since K2 is de-energized when the pushbutton is released; and the contact 328, which had been left in the closed position. At the completion of the vertical index, switch S3 will return to its normal position, thereby closing contacts 326 and 327 and opening contacts 328 stopping the vertical index motor B3. The more generic arrangement of the machine described herein is claimed in the copending application S.N. 445,921.

It will be understood that various modifications, alterations or substitutions may be introduced by those skilled, based on the teachng accompanying the invention described herein without departing from the intent and scope of the invention defined by the appended claims.

I claim:

1. In an automatic frankfurter storage cooking and dispensing apparatus, the improvement in refrigerated storage chambers for said apparatus comprising a magazine forming a plurality of discrete radially disposed frankfurter compartments to individually store frankfurters, said magazine comprising a circular unit provided with a stationary shroud to form said compartments in combination with a compartment divider element rotatably mounted on a horizontal axis, drive means to intermittently rotate said axis wherein said stored frankfurters are cycled en masse in said compartments in a substantially circular direction and wherein individual frankfurters, by an external on-demand dispense signal to said drive means, are fed externally from an opening in said shroud through a delivery chute to a receiver for said frankfurters, and means effecting registration of said rotatable divider element so that successive compartments are in registration with said opening, wherein said rotatable compartment divider element is provided with an inner mounting flange and said axis is provided with a relatively fixed securing bar equipped at its ends with movable securing element to removably lock said mounting flange on said bar.

References Cited

UNITED STATES PATENTS

| | | | |
|---|---|---|---|
| 969,735 | 9/1910 | Thornber | 221—86 X |
| 994,916 | 6/1911 | Francis | 221—86 |
| 1,821,739 | 9/1931 | Cramer. | |
| 1,264,603 | 4/1918 | Black. | |
| 2,273,948 | 2/1942 | Forslund et al. | 221—86 X |
| 2,464,737 | 3/1949 | Wellekens | 221—83 |
| 2,834,510 | 5/1958 | Cenotti | 221—150 |
| 2,907,004 | 9/1959 | Chien et al. | |
| 2,901,964 | 9/1959 | Johnson | 221—150 |
| 2,990,973 | 7/1961 | Chazen | 221—150 |
| 3,224,361 | 12/1965 | Ojelid | 221—150 |
| 3,237,804 | 3/1966 | Bardy et al. | 221—150 |
| 3,245,581 | 9/1966 | Reach | 221—150 |

WALTER SOBIN, *Primary Examiner.*